(12) United States Patent
Watanabe et al.

(10) Patent No.: US 9,256,101 B2
(45) Date of Patent: Feb. 9, 2016

(54) LIQUID CRYSTAL DISPLAY DEVICE

(71) Applicant: Japan Display Inc., Tokyo (JP)

(72) Inventors: Saburo Watanabe, Tokyo (JP); Akio Tezuka, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 37 days.

(21) Appl. No.: 14/034,772

(22) Filed: Sep. 24, 2013

(65) Prior Publication Data

US 2014/0092336 A1    Apr. 3, 2014

(30) Foreign Application Priority Data

Sep. 25, 2012  (JP) ................................ 2012-211081

(51) Int. Cl.
*G02F 1/1335* (2006.01)
(52) U.S. Cl.
CPC ........ *G02F 1/1336* (2013.01); *G02F 1/133615* (2013.01); *G02F 1/133605* (2013.01); *G02F 2201/34* (2013.01)
(58) Field of Classification Search
CPC .................... G02F 1/133615; G02F 1/133605; G02F 2201/34
USPC ................... 362/609, 612, 632–634
See application file for complete search history.

(56) References Cited

U.S. PATENT DOCUMENTS

| | | | |
|---|---|---|---|
| 7,575,360 B2* | 8/2009 | Ohno et al. | 362/633 |
| 7,938,569 B2* | 5/2011 | Cheng | 362/633 |
| 8,054,406 B2* | 11/2011 | Cheng | 349/65 |
| 8,727,595 B2* | 5/2014 | Lai | 362/609 |
| 2004/0218113 A1* | 11/2004 | You | 349/58 |
| 2010/0277669 A1* | 11/2010 | Adachi et al. | 362/606 |

(Continued)

FOREIGN PATENT DOCUMENTS

| CN | 102661550 A | 9/2012 |
|---|---|---|
| JP | 200698500 A | 4/2006 |
| JP | 2009-205866 A | 9/2009 |

(Continued)

OTHER PUBLICATIONS

Office Action dated Sep. 1, 2015 regarding a corresponding Japanese Patent Application No. 2012-211081.
Office Action dated Sep. 6, 2015 regarding a corresponding Chinese Patent Application No. 201310449304.1.

*Primary Examiner* — Bumsuk Won
*Assistant Examiner* — Ryan Crockett
(74) *Attorney, Agent, or Firm* — Lowe Hauptman & Ham, LLP

(57) ABSTRACT

Liquid crystal display device preventing brightness reduction of a backlight even when a recess is formed in a lower frame accommodating the backlight and a light-emitting diode substrate mounted with a light-emitting diode is accommodated in the recess. A backlight includes a reflection member arranged on the back side of a light guide plate, and the light-emitting diode irradiating the light guide plate with illumination light from a side portion of the light guide plate. The recess protruding on the back side is formed in the lower frame for accommodating and arranging the light-emitting diode substrate mounted with the light-emitting diode therein. A part of an end portion of the reflection member protrudes into a space formed by the recess toward the light emitting diode. A holding member is arranged between the reflection member and the lower frame at least to hold the protruding region of the reflection member.

6 Claims, 2 Drawing Sheets

(56) References Cited

U.S. PATENT DOCUMENTS

2012/0063163 A1* 3/2012 Lai .............................. 362/602
2012/0106197 A1* 5/2012 Lai et al. ...................... 362/609

FOREIGN PATENT DOCUMENTS

| JP | 2010-067568 A | 3/2010 |
| JP | 2010-097924 A | 4/2010 |

* cited by examiner

RELATED ART

LIQUID CRYSTAL DISPLAY DEVICE

CLAIM OF PRIORITY

The present application claims priority from Japanese Patent Application JP 2012-211081 filed on Sep. 25, 2012, the content of which is hereby incorporated by reference into this application.

FIELD OF THE INVENTION

The present invention relates to a liquid crystal display device, and specifically to the liquid crystal display device formed with a recess in a lower frame accommodating a backlight and with a light-emitting diode substrate mounted with a light-emitting diode accommodated and arranged in the recess.

BACKGROUND ART

The liquid crystal display device has been used as a display device for many electronic devices such as a mobile phone, a digital still camera, a personal digital assistant, and a medical equipment. Such a liquid crystal display device includes a backlight irradiating the liquid crystal display panel with an illumination light. A typical structure of the backlight employs, for example, as described in Japanese Unexamined Patent Publication No. 2006-98500, a configuration including a light guide plate and a reflection sheet on the back side of the liquid crystal display panel and arranged with a light-emitting diode serving as a light source on the side portion of the light guide plate.

On the other hand, as shown in FIG. 1, the liquid crystal display device equipped with a large backlight for a medical application and the like employs a configuration arranged with a light-emitting diode substrate 6 mounted with a light-emitting diode 7 on the side portion of the backlight. The liquid crystal display device shown in FIG. 1 includes a liquid crystal display panel 1 accommodated in an upper frame 4 and fixed by a mold 3 via a cushion 2, and a backlight constituted by a light guide plate 9 accommodated in a lower frame 5 and irradiating the back side of the liquid crystal display panel 1 with the illumination light, an optical member 10 including a diffusion sheet, prism sheet, and the like for irradiating the liquid crystal display panel 1 uniformly with the light guided by the light guide plate 9, a reflection member 8, and a light-emitting diode 7 irradiating the light guide plate 9 with the illumination light from the side portion of the light guide plate 9, wherein the light-emitting diode 7 is mounted on the light-emitting diode substrate 6 and accommodate and arranged in a recess 12 protruding on the back side of the lower frame 5.

In the liquid crystal display device shown in FIG. 1, the light emitted from the light-emitting diode 7 enters through a side face of the light guide plate 9 and diffuses all over the light guide plate 9. The light about to exit from the back side of the light guide plate 9 is reflected by the reflection member 8 to be returned to the inside of the light guide plate 9, and the light exiting from the front side of the light guide plate 9 is controlled by the optical member 10 constituted by the diffusion sheet, the prism sheet, and the like to fall on the entire liquid crystal display panel 1 uniformly.

The lower frame 5 provided with the recess 12 for accommodating and arranging the light-emitting diode substrate 6 is generally formed of a light metal such as aluminum or a resin. To form the recess 12 in the lower frame 5, the U-shaped recess 12 as shown in FIG. 1 is formed by a mechanical bending process or the like. Due to the limited ability of the process, it is inevitable that the convex portion has a substantial width.

The light guide plate 9 and the reflection member 8 need to be arranged as close to the light-emitting diode 7 as possible to propagate and reflect the light emitted from the light-emitting diode 7 without a loss. Accordingly, the light guide plate 9 and the reflection member 8 in the proximity of the light-emitting diode 7 partially protrude in a space formed by the recess 12 toward the light-emitting diode 7.

As a result, the portion of the reflection member 8 protruding into the space formed by the recess 12 bows downward in the recess 12 over time due to its own weight, forming a gap in between with the light guide plate 9. When the gap is formed between the reflection member 8 and the light guide plate 9, as indicated by a dashed arrow in FIG. 1, a part of the light emitted from the light-emitting diode 7 and falling downward from the light guide plate 9 cannot be reflected upward by the reflection member 8 but diffused to the outside. Consequently, an availability of the light emitted from the light-emitting diode 7 reduces and the brightness lowers on the whole backlight or locally. Such a gap between the reflection member 8 and the light guide plate 9 is also generated by a deformation due to the stress applied when forming the recess 12 in the lower frame 5 or by a warpage of the lower frame 5 due to aging.

Another problem arising when the light-emitting diode 7 is used as the light source of the liquid crystal display device would be heating of the light-emitting diode 7. That is, the luminous efficiency of the light-emitting diode is typically between a few percent and twenty percent, with a large part of the remaining energy being converted into heat leading to heat generation. This heat generation may cause a characteristic degradation of the light-emitting diode and peripheral devices.

SUMMARY OF THE INVENTION

Problem to be Solved by the Invention

It is an object of the present invention to provide a liquid crystal display device which can eliminate the problems described above and prevent brightness reduction of the backlight even when the recess is formed in the lower frame accommodating the backlight and the light-emitting diode substrate mounted with the light-emitting diode is accommodated and arranged in the recess.

It is another object of the present invention to provide a liquid crystal display device which can minimize an effect of the heat generation even when the light-emitting diode is used as the light source.

Means for Solving Problem

To solve the problems described above, a liquid crystal display device according to the following technical features.

(1) A liquid crystal display device including a liquid crystal display panel, a backlight irradiating a back side of the liquid crystal display panel with an illumination light, and a lower frame accommodating the backlight is characterized in that the backlight includes a light guide plate, a reflection member arranged on the back side of the light guide plate, and a light-emitting diode irradiating the light guide plate with the illumination light from a side portion of the light guide plate, that a recess protruding on the back side is formed in the lower frame for accommodating and arranging a light-emitting diode substrate mounted with the light-emitting diode therein, that a part of an end portion of the reflection member protrudes into a space formed by the recess toward the light emitting diode, and that a holding member is arranged between the reflection member and the lower frame at least to hold the protruding region of the reflection member.

(2) The liquid crystal display device described in (1) is characterized in that at least one of the holding member and the lower frame is formed of an aluminum plate.

(3) The liquid crystal display device described in (1) or (2) is characterized in that the reflection member and the holding member have a substantially same shape.

(4) The liquid crystal display device described in any one of (1) to (3) is characterized in that the light-emitting diode substrate is fixed to the recess by a heat-conductive adhesive.

(5) The liquid crystal display device described in any one of (1) to (4) is characterized in that a length of a portion of the holding member protruding toward the light-emitting diode more than the reflection member is within 0.5 mm.

Effect of the Invention

According to the liquid crystal display device of the present invention, the recess is formed in the lower frame accommodating the backlight, a part of the end portion of the reflection member protrudes into the space formed by the recess toward the light-emitting diode even when the light-emitting diode substrate mounted with the light-emitting diode is accommodated and arranged in the recess, and the holding member is arranged between the reflection member and the lower frame at least to hold the protruding region of the reflection member, thereby preventing the reflection member from bowing. This enables prevention of the brightness reduction of the backlight caused by the light from the light-emitting diode diffused without being reflected toward the liquid crystal display panel.

Furthermore, because at least one of the holding member and the lower frame is formed of the aluminum plate or the light-emitting diode substrate is fixed to the recess by the heat-conductive adhesive, it is possible to provide a liquid crystal display device capable of minimizing the effect of the heat generation even when the light-emitting diode is used as the light source.

BEST MODE FOR CARRYING OUT THE INVENTION

A liquid crystal display device according to the present invention is described below in detail with reference to preferable examples.

Figure 2:
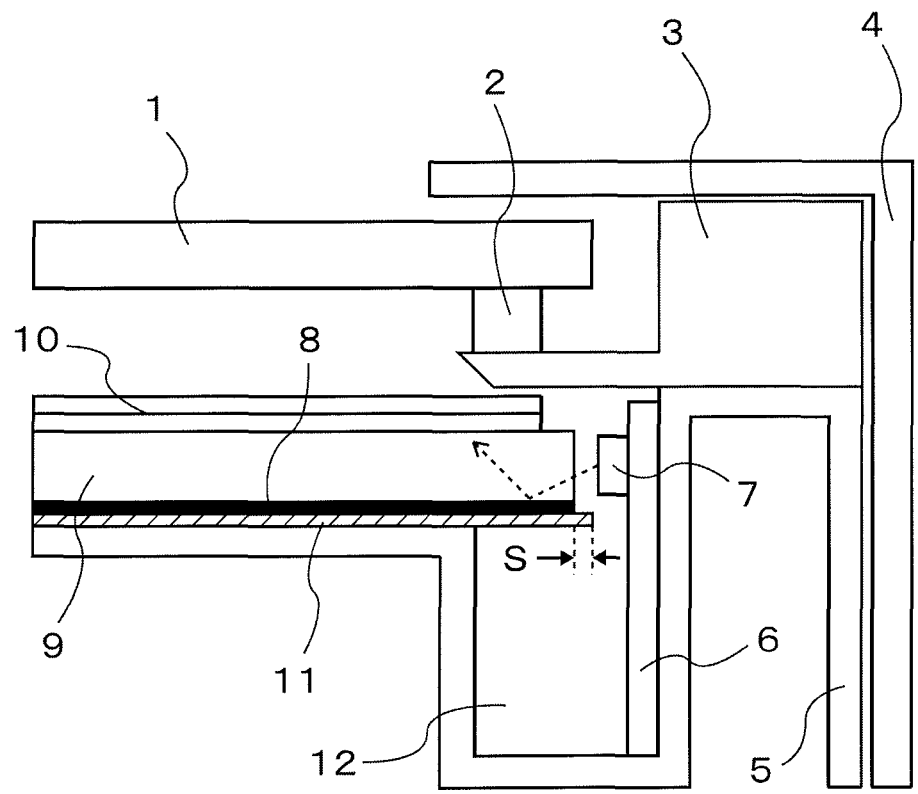
FIG. 2 is a schematic diagram illustrating an embodiment of a liquid crystal display device according to the present invention.
Figure 3:
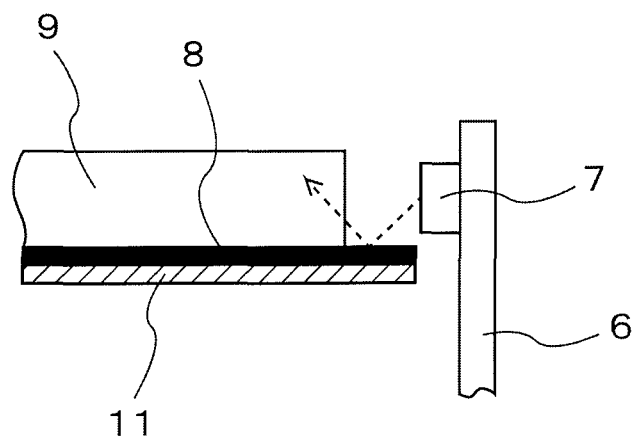
FIG. 3 is a schematic diagram illustrating another embodiment of the liquid crystal display device according to the present invention.

FIG. 2 is a schematic diagram illustrating an embodiment of a liquid crystal display device according to the present invention, and FIG. 3 is a schematic diagram illustrating another embodiment of the liquid crystal display device according to the present invention. It should be noted that an illustration of a liquid crystal display panel and the like is omitted in FIG. 3.

The liquid crystal display device according to the present invention including, as shown in FIG. 2, a liquid crystal display panel 1, a backlight irradiating a back side of the liquid crystal display panel 1, and a lower frame 5 accommodating the backlight is characterized in that the backlight includes a light guide plate 9, a reflection member 8 arranged on the back side of the light guide plate, 9, and a light-emitting diode 7 irradiating the light guide plate 9 with the illumination light from a side portion of the light guide plate 9, that a recess 12 protruding on the back side is formed in the lower frame 5 for accommodating and arranging a light-emitting diode substrate 6 mounted with the light-emitting diode 7 therein, that a part of an end portion of the reflection member 8 protrudes into a space formed by the recess 12 toward the light emitting diode 7, and that a holding member 11 is arranged between the reflection member 8 and the lower frame 5 at least to hold the protruding region of the reflection member 8.

Figure 1:
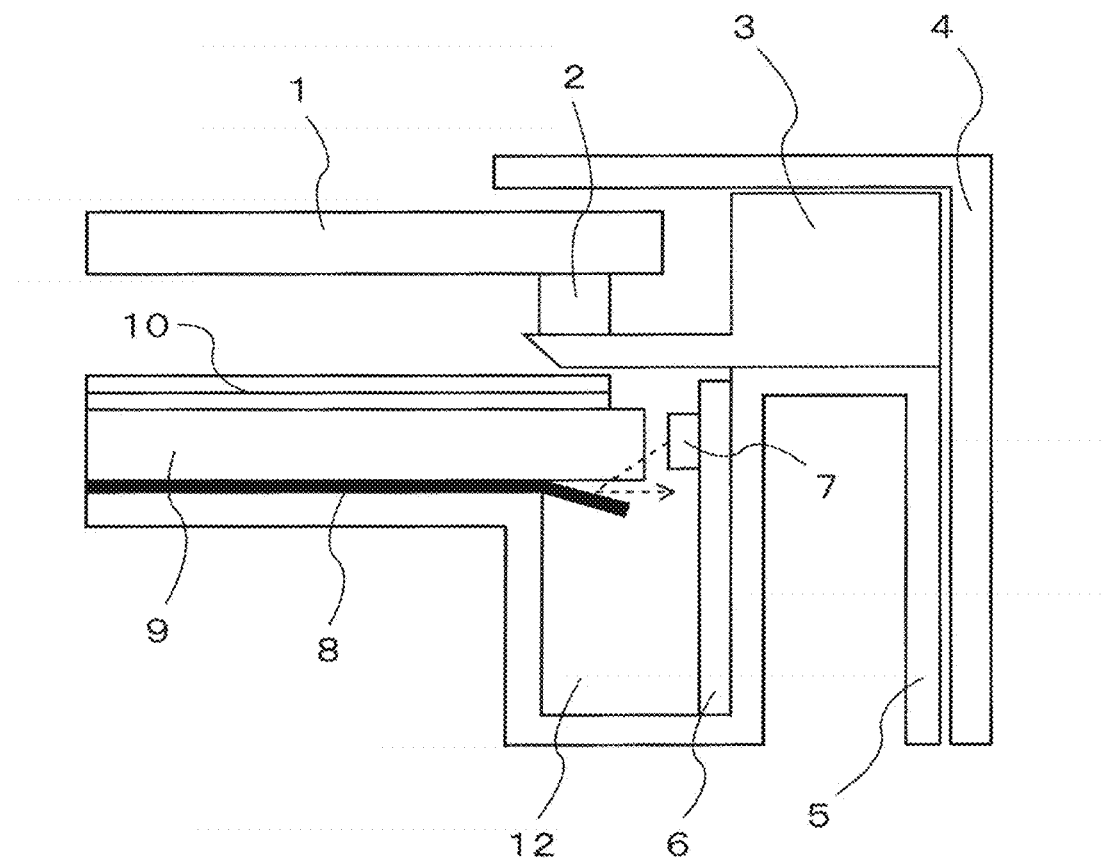
FIG. 1 is a schematic diagram illustrating a conventional liquid crystal display device.

For the liquid crystal display device shown in FIG. 2, the same reference number refers to the same component as in FIG. 1, and therefore an explanation thereof is omitted or simplified.

The present invention is characterized by arranging the holding member 11 between the reflection member 8 and the lower frame 5 at least to hold the protruding region of the reflection member 8 to the convex portion 12.

Thus, by arranging the holding member 11, the holding member 11 supports the reflection member 8 from below, thereby preventing the reflection member 8 from bowing. As a result, no gap is generated between the reflection member 8 and the light guide plate 9, and therefore there is no loss of the light entering the light guide plate 8 from the light-emitting diode 7, which allows for retaining the brightness of the backlight without lowering it.

Furthermore, even when a stress is applied to the lower frame 5 to deform it or when the lower frame 5 warps due to aging degradation, the holding member 11 still retains the reflection member 8 without deformation, which also allows for retaining the brightness of the backlight without lowering it.

Although a material for the holding member is not especially limited as long as it has a sufficient strength that does not bow even when a certain amount of load is applied like resins and metals, a material containing a light metal such as an aluminum plate with a high heat conductivity is preferable in order to control the effect by heat generation from the light-emitting diode, as described later.

If a length S of a portion of the holding member 11 protruding toward the light-emitting diode 7 more than the reflection member 8 is too long, then it is difficult to arrange the reflection member 8 in the proximity of the light-emitting diode 7 and the irradiated light from the light-emitting diode is easily diffused on a surface of the holding member 11, which leads to the reduction in brightness. For this reason, it is desirable that the length S of the holding member 11 protruding more than the reflection member 8 is 0.5 mm or less.

For the size of the reflection member 8 and the holding member 11, as shown in FIG. 3, the reflection member 8 and the holding member 11 may have the substantially same size. The term "substantially same size" does not mean the precisely same size in physical terms but it means that both have the approximately same size and the holding member has the size adequate to control the bowing of the reflection member. Moreover, as shown in FIG. 3, when the reflection member 8 and the holding member 11 are larger than the light guide plate 9 in size, the light that does not directly enter the light guide plate 9 can also be reflected and fall on the liquid crystal display panel (not shown) as indicated by the dashed arrow, thereby improving the availability of the illumination light.

Furthermore, when the light emitting diode is used as the light source as with the liquid crystal display device according to the present invention, the heat generation due to the light emission also arises as a problem. This is because the characteristics (life) of the light-emitting diode and the peripheral devices may be degraded if the temperature increases in the device due to the heat generation of the light-emitting diode.

Accordingly, in order to control the effect by the heat generation of the light-emitting diode 7, at least one of the lower frame 5 and the holding member 11 may preferably be formed of a highly heat-conductive material, and the material including the light metal such as the aluminum plate and the resin with the high heat conductivity may also be used in view of durability and light weight.

Furthermore, because the light-emitting diode substrate 6 mounted with the light-emitting diode 7 is susceptible to the effect of the heat generation of the light-emitting diode 7, the light-emitting diode substrate 6 is preferably fixed to the lower frame 5 using a heat-conductive adhesive. As the heat-conductive adhesive, a resin adhesive using a resin such as epoxy and a heat-conductive tape using an acrylic adhesive may be used.

Although the description of the present invention has been given above based on the embodiments, it is needless to say that the present invention is not limited to the embodiments but design modifications can be made without departing from the scope of the present invention.

INDUSTRIAL APPLICABILITY

The present invention can provide the liquid crystal display device capable of preventing the brightness reduction of the backlight even when the recess is formed in the lower frame accommodating the backlight and the light-emitting diode substrate mounted with the light-emitting diode is accommodated and arranged in the recess. In addition, the invention can provide the liquid crystal display device capable of minimizing the effect of the heat generation even when the light-emitting diode is used as the light source.

What is claimed is:

1. A liquid crystal display device comprising:
   a liquid crystal display panel,
   a backlight irradiating a back side of the liquid crystal display panel with an illumination light, and
   a lower frame accommodating the backlight,
   wherein
   the backlight comprises a light guide plate, a reflection member arranged on the back side of the light guide plate, and a light-emitting diode irradiating the light guide plate with the illumination light from a side portion of the light guide plate,
   a recess protruding on the back side is formed in the lower frame for accommodating and arranging a light-emitting diode substrate mounted with the light-emitting diode therein,
   a part of an end portion of the reflection member protrudes into a space formed by the recess toward the light emitting diode,
   a holding member is arranged between the reflection member and the lower frame at least to hold the protruding region of the reflection member,
   the holding member overlaps with the liquid crystal display panel in a planar view, wherein the holding member is formed of an aluminum plate, and
   the reflection member and the holding member are different members, and the reflection member and the holding member have a substantially same shape.

2. The liquid crystal display device according to claim 1, wherein the lower frame is formed of an aluminum plate.

3. The liquid crystal display device according to claim 1, wherein the light-emitting diode substrate is fixed to the recess by a heat-conductive adhesive.

4. The liquid crystal display device according to claim 2, wherein the light-emitting diode substrate is fixed to the recess by a heat-conductive adhesive.

5. The liquid crystal display device according to claim 1, wherein a length of a portion of the holding member protruding toward the light-emitting diode more than the reflection member is within 0.5 mm.

6. The liquid crystal display device according to claim 2, wherein a length of a portion of the holding member protruding toward the light-emitting diode more than the reflection member is within 0.5 mm.

* * * * *